United States Patent
Sanchez et al.

(10) Patent No.: US 10,284,317 B1
(45) Date of Patent: May 7, 2019

(54) SYSTEMS AND METHODS FOR ASSESSING SOUND WITHIN A VEHICLE USING MACHINE LEARNING TECHNIQUES

(71) Applicant: BlueOwl, LLC, Bloomington, IL (US)

(72) Inventors: Kenneth Jason Sanchez, San Francisco, CA (US); Vinay Kumar, San Francisco, CA (US)

(73) Assignee: BLUEOWL, LLC, Bloomington, IL (US)

( * ) Notice: Subject to any disclaimer, the term of this patent is extended or adjusted under 35 U.S.C. 154(b) by 16 days.

(21) Appl. No.: 15/659,242

(22) Filed: Jul. 25, 2017

(51) Int. Cl.
*H04B 1/20* (2006.01)
*H04H 20/62* (2008.01)
*G08G 1/0965* (2006.01)

(52) U.S. Cl.
CPC .......... *H04H 20/62* (2013.01); *G08G 1/0965* (2013.01); *H04B 1/20* (2013.01); *B60W 2550/408* (2013.01)

(58) Field of Classification Search
USPC ... 381/86, 89, 332, 78, 82, 83, 84, 85, 71.4, 381/302
See application file for complete search history.

(56) References Cited

U.S. PATENT DOCUMENTS

| | | | |
|---|---|---|---|
| 4,747,064 A * | 5/1988 | Johnston | B60Q 9/008 340/870.15 |
| 4,785,474 A * | 11/1988 | Bernstein | B60Q 5/00 324/76.31 |
| 5,278,553 A | 1/1994 | Cornett et al. | |
| 6,362,749 B1 | 3/2002 | Brill | |
| 7,061,402 B1 | 6/2006 | Lawson | |
| 7,446,674 B2 | 11/2008 | McKenna | |
| 7,791,499 B2 | 9/2010 | Mohan et al. | |
| 8,233,919 B2 | 7/2012 | Haag et al. | |
| 8,824,997 B2 | 9/2014 | Gehlen et al. | |
| 8,842,021 B2 | 9/2014 | Behm et al. | |
| 8,886,153 B2 | 11/2014 | Velusamy et al. | |
| 9,105,187 B2 | 8/2015 | Aliakseyeu et al. | |
| 9,111,447 B2 | 8/2015 | Holland | |

(Continued)

*Primary Examiner* — Yosef K Laekemariam
(74) *Attorney, Agent, or Firm* — Armstrong Teasdale LLP

(57) ABSTRACT

A computer system for assessing sound within a vehicle to alert a driver of the vehicle to an approaching emergency services vehicle includes a processor and a non-transitory, tangible, computer-readable storage medium having instructions stored thereon that, in response to execution by the processor, cause the processor to perform operations including: (i) analyzing, based upon a machine learning algorithm, sound data associated with an emergency services vehicle siren; (ii) identifying, based upon the analyzing, a first characteristic associated with the emergency services vehicle siren; (iii) receiving, from a client device disposed within the vehicle, sound data collected within the vehicle; (iv) analyzing the sound data collected within the vehicle; (v) identifying, based upon the analyzing, a second characteristic associated with the sound data collected within the vehicle; (vi) comparing the first characteristic to the second characteristic; and (vii) determining, based upon the comparing, whether the first characteristic substantially matches the second characteristic to determine whether the emergency services vehicle is approaching the vehicle.

33 Claims, 4 Drawing Sheets

(56) References Cited

U.S. PATENT DOCUMENTS

| | | |
|---|---|---|
| 9,609,416 B2 | 3/2017 | Kaller et al. |
| 2003/0030548 A1 | 2/2003 | Kovacs et al. |
| 2005/0192746 A1* | 9/2005 | King .................. G01C 21/26 701/468 |
| 2007/0008175 A1 | 1/2007 | Johnson et al. |
| 2008/0106435 A1* | 5/2008 | Kirkpatrick .......... G08G 1/0965 340/902 |
| 2016/0071399 A1 | 3/2016 | Altman et al. |
| 2016/0105644 A1 | 4/2016 | Smith et al. |
| 2018/0046869 A1* | 2/2018 | Cordell .............. G06K 9/00845 |

* cited by examiner

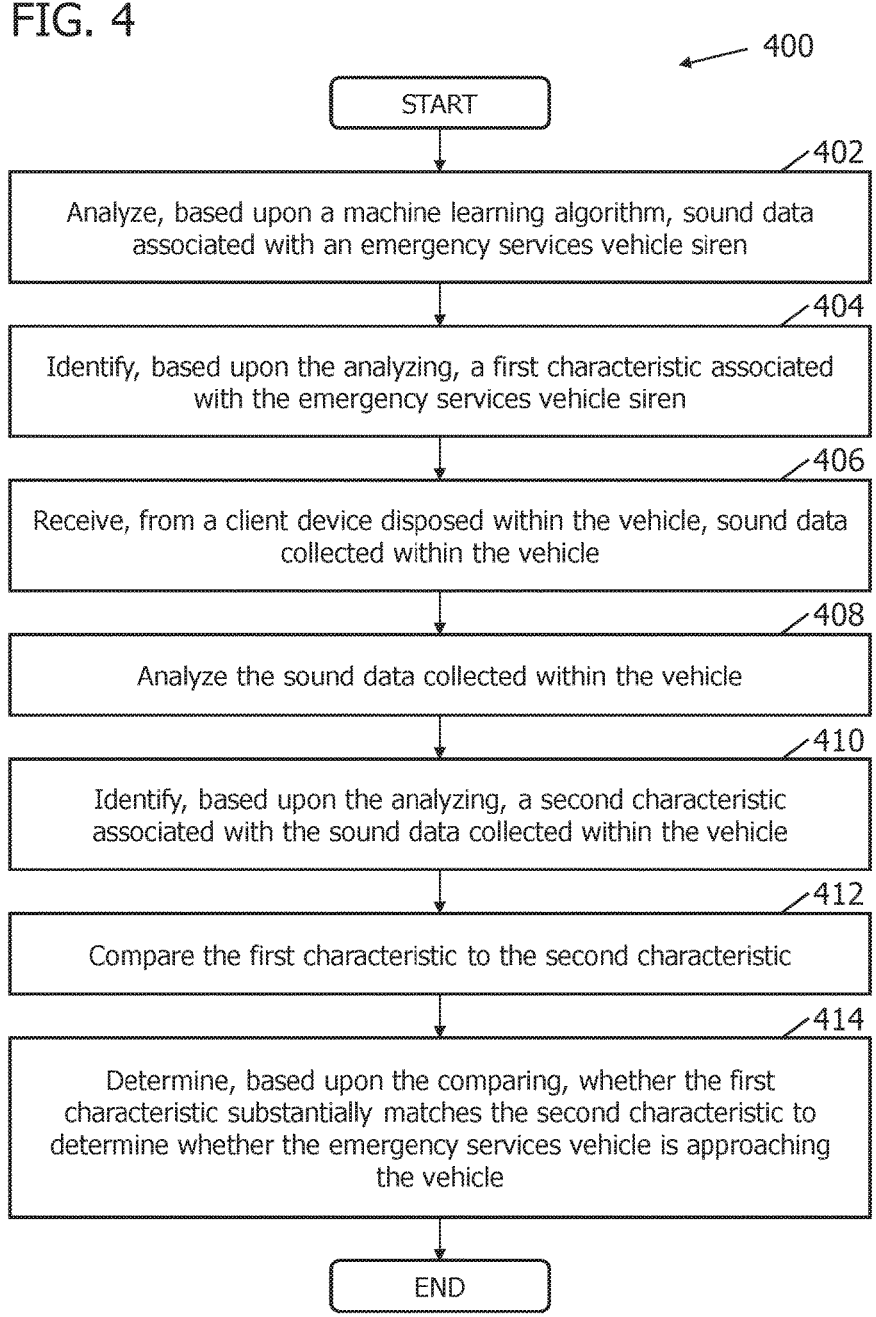

SYSTEMS AND METHODS FOR ASSESSING SOUND WITHIN A VEHICLE USING MACHINE LEARNING TECHNIQUES

FIELD OF THE INVENTION

The present disclosure relates to systems and methods for monitoring sound within a vehicle to alert a driver of the vehicle to an approaching, or proximally located, emergency services vehicle. More particularly, the present disclosure relates to systems and methods for monitoring sound within a vehicle, such as through a microphone of a mobile communications device disposed within the vehicle, to identify a siren of an approaching emergency services vehicle, wherein a software application running on the mobile communications device is configured to identify the siren using machine learning techniques even in the presence of other sounds, such as music or other audio playing within the vehicle.

BACKGROUND

Emergency services vehicles, such as ambulances and fire and rescue vehicles, share their traffic routes with a variety of other non-emergency vehicles, such as cars and trucks carrying one or more occupants. During operation, the cabins of non-emergency vehicles may be insulated from various traffic sounds, such as sirens utilized by emergency services vehicles to warn surrounding traffic of their approach. In addition, many common non-emergency vehicles are equipped with entertainment devices, such as radios, and in some modern multi-passenger vehicles, video playback devices, such as DVD players and video displays, which may fill the cabin of such non-emergency vehicles with a variety of sound or noise.

As a result, an occupant of a typical non-emergency vehicle may not hear a siren emitted by an approaching emergency services vehicle in time to maneuver the non-emergency vehicle piloted by the occupant out of the path of the emergency services vehicle. For example, the sound produced by a radio or video playback device within the non-emergency vehicle may obscure the sound of an approaching emergency services vehicle. This effect may be exacerbated when entertainment devices, such as radios, are played at high volume levels. In addition, hearing impaired occupants may have difficulty distinguishing a siren sound emitted by an approaching emergency services vehicle.

Systems and methods for assessing sound within a non-emergency vehicle to alert an occupant, such as a driver, of the non-emergency vehicle, to an approaching emergency services vehicle are therefore desirable. More particularly, systems and methods utilizing a mobile communications device (such as a smartphone) within a non-emergency vehicle to detect or identify a siren sound associated with an approaching emergency services vehicle are desirable, especially under cabin conditions, such a radio playing music turned to a high volume, that may tend to drown out or obscure the sound of an approaching siren. In addition, systems and methods utilizing the mobile communications device to provide a secondary or supplemental alert, such as a supplemental visual or aural alert, in response to detection of an oncoming siren, are desirable.

BRIEF SUMMARY

The present embodiments relate to systems and methods for assessing sound within a vehicle to alert a driver of the vehicle to an approaching, or proximally located, emergency services vehicle. More particularly, the present embodiments relate to systems and methods for assessing sound within a vehicle to identify at least one characteristic of sound data collected within the vehicle. The at least one characteristic may be compared to at least one other stored characteristic of a siren sound or siren sound data to determine whether the sound data collected within the vehicle includes a siren sound or a siren sound characteristic. If such a siren sound characteristic is included in the vehicle sound data, the system may determine that an emergency services vehicle is approaching or otherwise nearby.

Accordingly, in one aspect, a computer-based method for assessing sound within a vehicle to alert a driver of the vehicle to an approaching emergency services vehicle is provided. The method may be performed using a sound analysis computing device that includes at least one processor in communication with at least one memory device, and the method may include: (i) analyzing, based upon a machine learning algorithm, sound data associated with an emergency services vehicle siren; (ii) identifying, based upon the analyzing, a first characteristic associated with the emergency services vehicle siren; (iii) receiving, from a client device disposed within the vehicle, sound data collected within the vehicle; (iv) analyzing the sound data collected within the vehicle; (v) identifying, based upon the analyzing, a second characteristic associated with the sound data collected within the vehicle; (vi) comparing the first characteristic to the second characteristic; and (vii) determining, based upon the comparing, whether the first characteristic substantially matches the second characteristic to determine whether the emergency services vehicle is approaching the vehicle.

In yet another aspect, a computer system for assessing sound within a vehicle to alert a driver of the vehicle to an approaching emergency services vehicle is provided. The computer system may include a processor and a non-transitory, tangible, computer-readable storage medium having instructions stored thereon that, in response to execution by the processor, cause the processor to perform operations including: (i) analyzing, based upon a machine learning algorithm, sound data associated with an emergency services vehicle siren; (ii) identifying, based upon the analyzing, a first characteristic associated with the emergency services vehicle siren; (iii) receiving, from a client device disposed within the vehicle, sound data collected within the vehicle; (iv) analyzing the sound data collected within the vehicle; (v) identifying, based upon the analyzing, a second characteristic associated with the sound data collected within the vehicle; (vi) comparing the first characteristic to the second characteristic; and (vii) determining, based upon the comparing, whether the first characteristic substantially matches the second characteristic to determine whether the emergency services vehicle is approaching the vehicle.

In yet another aspect, a non-transitory computer readable medium that includes executable instructions for assessing sound within a vehicle to alert a driver of the vehicle to an approaching emergency services vehicle is provided. The instructions may be executed by a sound analysis computing device that includes at least one processor in communication with at least one memory device. When the instructions are executed, the instructions may cause the processor of the sound analysis computing device to perform operations including: (i) analyzing, based upon a machine learning algorithm, sound data associated with an emergency services vehicle siren; (ii) identifying, based upon the analyzing, a first characteristic associated with the emergency services vehicle siren; (iii) receiving, from a client device disposed within the vehicle, sound data collected within the vehicle; (iv) analyzing the sound data collected within the vehicle; (v) identifying, based upon the analyzing, a second characteristic associated with the sound data collected within the vehicle; (vi) comparing the first characteristic to the second characteristic; and (vii) determining, based upon the comparing, whether the first characteristic substantially matches the second characteristic to determine whether the emergency services vehicle is approaching the vehicle.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 4 illustrates an exemplary process implemented by the computer system shown in FIG. 1 for assessing sound within a vehicle to alert a driver of the vehicle to an approaching emergency services vehicle.

Figure 1:
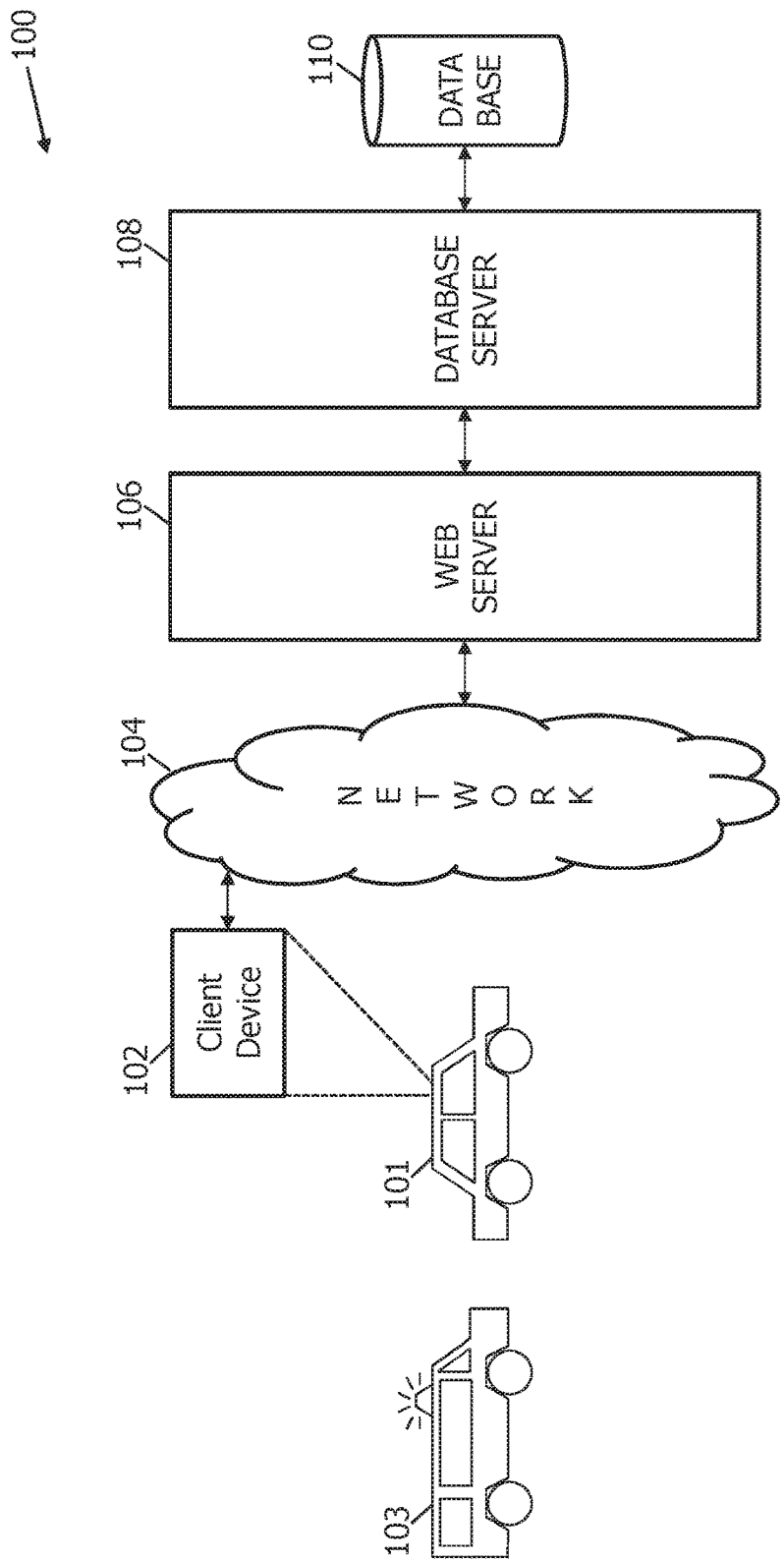
FIG. 1 illustrates a schematic diagram of an exemplary computer system for assessing sound within a vehicle to alert a driver of the vehicle to an approaching emergency services vehicle.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for assessing sound within a vehicle to alert a driver of the vehicle to an approaching emergency services vehicle. In one exemplary embodiment, the process may be performed by at least one front-end system, such as a client device, and at least one back-end system, such as a web server and/or a database server.

Accordingly, the system may include a client device, such as a personal computer or a mobile communications device. The user may connect to the back-end system via the client device to initiate a process for assessing sound within a vehicle to alert a driver of the vehicle to an approaching emergency services vehicle. More particularly, the backend system may deliver a mobile application (e.g., a smartphone "app") to the client device. The smartphone app may analyze sound within a vehicle, such as a non-emergency services vehicle or any other type of vehicle that is capable of transporting one or more occupants. In addition, and as described below, the backend system and/or the smartphone app may compare one or more characteristics of sound data collected within the vehicle to one or more characteristics associated with one or more emergency services vehicle sirens to determine whether an emergency services vehicle is approaching or proximal to the vehicle and/or to determine a particular type of emergency services vehicle that is approaching and/or proximal to the vehicle.

In various embodiments, a backend system (e.g., a web server and/or a database server) and/or a client device may analyze sound data associated with the sirens of one or more emergency services vehicles. This sound data may be stored in a database and may include digital and/or analog sound data associated with the sirens of a plurality of emergency services vehicles.

The analysis may be performed based upon one or more machine learning algorithms (as described below), such as one or more machine learning algorithms configured to identify one or more characteristics common to emergency services vehicle sirens. In some cases, a machine learning algorithm may also identify a plurality of different emergency services vehicle sirens based upon the analysis. Each of these different identified sirens may be associated with one or more characteristics, such as frequency characteristics, amplitude characteristics, various other waveform characteristics, and the like, and each may be stored in database as a unique siren sound or siren "signature."

Thus, the system may identify, based upon an analysis of various sound data associated with one or more emergency services vehicles, one or more characteristics, such as at least a first characteristic, associated with one or more emergency services vehicle sirens. Where a particular siren sound is identified and associated with a plurality of characteristics, these characteristics may collectively be referred to as a siren signature or a siren sound signature.

During operation of the vehicle, the system may, in addition, receive, from the client device (which may be disposed or located within the vehicle), sound data, such as ambient sound data, collected within the vehicle, such as within a cabin or interior of the vehicle. More particularly, a smartphone app, as described above, running on the client device may "listen" to or detect the sound within the vehicle. The client device may, in addition (and as described above) include an analog to digital converter, which may convert analog sound data collected by the client device to digital sound data.

In response to receiving the sound data from the client device, the system may analyze the sound data. More particularly, the system may analyze the sound data collected within the vehicle to identify one or more characteristics, such as at least a second characteristic, of the sound data collected within the vehicle. These characteristics may include frequency characteristics, amplitude characteristics, various other waveform characteristics, and the like. Further, where a plurality of characteristics are identified in conjunction with the sound data, the sound characteristics may collectively define a second or vehicle sound signature.

In addition, in some cases, the system may identify a plurality of groups of characteristics or a plurality of sound signatures within the sound data, such that sound data collected within the vehicle actually includes a plurality of sound signatures. This may occur, for example, as a result of a plurality of distinct sounds within the vehicle, such as a first sound associated with music playing within the vehicle and a second sound associated with an emergency services vehicle siren penetrating or impinging upon the vehicle. The emergency services vehicle siren sound may, in other words, intermingle or intermix with one or more other sounds within the vehicle, such as the sound of music playing within the vehicle.

The system may, under such a circumstance, identify characteristics associated with both sounds, such that the music playing within the vehicle is associated with a first characteristic, a first group of characteristics, or a first sound signature, and the sound of the emergency services vehicle siren impinging upon the vehicle is associated with a second characteristic, a second group of characteristics, or a second sound signature.

In response to identifying at least one characteristic associated with the sound data collected within the vehicle, the system may compare the at least one characteristic to at least one characteristic of one or more emergency services vehicle siren sounds. For example, the system may compare one or more frequency characteristics and/or one or more amplitude characteristics of the sound data collected within the vehicle to one or more frequency characteristics and/or one or more amplitude characteristics of the sound data associated with a particular emergency services vehicle siren. If the comparison yields a match, the system may determine that the sound data collected within vehicle includes frequency, amplitude, or other waveform characteristics of an emergency services vehicle siren, which may suggest or indicate that an emergency services vehicle is approaching or proximal to the vehicle. Thus, the system may determine, based upon such a comparison, that an emergency services vehicle is approaching or otherwise proximal to the vehicle.

In some embodiments, the system may determine that an emergency services vehicle is approaching or otherwise proximal to the vehicle based upon a partial or substantial match between at least one characteristic of sound data collected within the vehicle and at least one characteristic of sound data associated with an emergency services vehicle siren. As used herein, a "substantial" match may be made between at least one characteristic of sound data collected within the vehicle and at least one characteristic of sound data associated with an emergency services vehicle siren when the characteristics are similar (e.g., within a predefined range of each other) but not exactly the same.

Further, in some embodiments, the system may compare a plurality of frequency characteristics and/or a plurality of amplitude characteristics of the sound data collected within the vehicle to a plurality of frequency characteristics and/or a plurality of amplitude characteristics of the sound data associated with a particular emergency services vehicle siren. Specifically, the system may compare a sound signature associated with the sound data collected within the vehicle to a sound signature of an emergency services vehicle siren. In addition, in some cases, the system may compare a sound signature associated with the sound data collected within the vehicle to a plurality of sound signatures associated with a plurality of emergency services vehicle sirens. If the sound signature associated with the sound data collected within the vehicle matches, or substantially matches, at least one sound signature of an emergency services vehicle siren, the system may determine that an emergency services vehicle is approaching or proximal to the vehicle. In addition, where the system compares the sound signature associated with the sound data collected within the vehicle to a plurality of sound signatures associated with a plurality of emergency services vehicle sirens, the system may further identify a specific type of emergency services vehicle (e.g., ambulance, fire and rescue vehicle, etc.) associated with the sound signature that matches, or substantially matches, the sound data collected within the vehicle.

The system may, in addition, provide an indication, such as a message and/or a control instruction, to the client device and/or an onboard diagnostics system controller of the vehicle indicating that an emergency services vehicle is approaching or proximal to the vehicle. For example, the system may provide an alert to the client device, such as an audible and/or visual alert, indicating the presence of an emergency services vehicle. The client device may receive and broadcast an audible alert and/or display a visual alert, such that an occupant of the vehicle is alerted to the presence of an approaching or proximal emergency services vehicle. Further, in some embodiments, a control instruction may be provided to an onboard diagnostics system controller of the vehicle, which may cause a device within the vehicle, such as a radio and/or a video display, to broadcast or display an alert indicating the presence of an emergency services vehicle. In addition, in some embodiments, the control instruction may cause the onboard diagnostics system controller of the vehicle to reduce a volume level (e.g., of a radio or another entertainment device) within the vehicle.

In one exemplary embodiment, the client device and/or the onboard diagnostics system controller of the vehicle may assess the driving behavior of the pilot or driver of the vehicle in response to an indication or alert that an emergency services vehicle is approaching or proximal the vehicle. For example, the client device (which may include, in addition to a microphone, a GPS receiver and/or an accelerometer) may be capable of determining whether the driver of the vehicle reduces a sound volume within the vehicle and/or whether the driver of vehicle removes the vehicle from traffic and/or takes other evasive or precautionary maneuvers in response to receiving the alert. Such data may also be collected by the onboard diagnostics system controller of the vehicle.

The system may, in addition, store the detected and/or assessed driving behavior for analysis and evaluation. For example, the system may analyze the driving behavior of a driver of the vehicle to determine whether the driver reduces a sound volume or takes evasive or precautionary driving maneuvers in response to receiving an alert. In some embodiments, if the driver reduces a sound volume or takes evasive or precautionary maneuvers, the system may assign a particular safety rating to the driver, which may be used in conjunction with an auto insurance premium (e.g., to lower an auto insurance premium) of the driver. On the other hand, if the driver does not reduce a sound volume or does not take evasive or precautionary maneuvers, the system may assign a particular safety rating to the driver, which may be used in conjunction with an auto insurance premium (e.g., to raise or refuse a reduction of an auto insurance premium) of the driver.

In some embodiments, the client device may receive a signal that indicates a location or a position of an emergency services vehicle, such as an emergency dispatch signal, which may be broadcast over a particular area by an electronic communications system, such as by one or more cellular sites or cellular towers, and/or received by the backend system and provided to the client device. The emergency dispatch signal may include GPS coordinates associated with an emergency services vehicle and/or any other location data that provides, or that may be analyzed by the client device and/or the backend system to determine, a location or route of an approaching emergency services vehicle.

In response to receiving such an emergency dispatch signal, the client device and/or the backend system may analyze data included in the signal, such as one or more GPS coordinates associated with an emergency services vehicle and/or a route of the emergency services vehicle to determine whether the emergency services vehicle is approaching, or otherwise proximal, the client device (or the vehicle within which the client device operates). If the client device and/or the backend system determines that the emergency services vehicle is approaching or proximal, the client device may, in some embodiments, provide an alert (e.g., an alert irrespective of received sound data), as described herein.

In other embodiments, the client device and/or the backend system may reduce a matching threshold associated with the comparison of sound data received within the vehicle to sound data associated with one or more emergency services vehicle sirens (as described above). For example, in the case that an emergency dispatch signal is received, the amount of matching required between a characteristic associated with sound data collected within a vehicle and a characteristic of sound data associated with one or more emergency services vehicle sirens may be reduced, such that sound data collected within the vehicle that would only indicate a weak or attenuated emergency services vehicle siren (e.g., a distant siren) may nevertheless, in conjunction with the emergency dispatch signal, trigger an alert, as described herein.

In addition, in some embodiments, the client device the backend system may provide map directions, such as to a display of the client device and/or a display (e.g., a navigation display) within the vehicle. Such an action may be implemented in any of the embodiments described herein, including embodiments that include a received emergency dispatch signal and embodiments that do not include such a signal and/or embodiments in which such a signal is not received. Thus, in some embodiments, the client device and/or a display within the vehicle (such as a GPS navigation system within the vehicle) may display a location of an approaching emergency services vehicle, a route that would allow the driver of the vehicle to avoid the approaching emergency services vehicle, and the like.

Exemplary technical effects of the systems, methods, and computer-readable media described herein may include, for example: (a) identifying, based upon a machine learning algorithm, one or more characteristics of a siren sound or siren sound data, including, for example, frequency and/or amplitude characteristics; (b) identifying, based upon a machine learning algorithm, a siren sound signature, which may include multiple characteristics, such as multiple waveform characteristics, of a siren sound and/or siren sound data; (c) receiving ambient sound within a cabin of a vehicle; (d) converting the ambient sound data from an analog format to a digital format; (e) analyzing the sound data collected within the vehicle to identify one or more characteristics, such as one or more frequency and/or amplitude characteristics, of the sound data; (f) analyzing the sound data collected within the vehicle to identify one or more sound signatures, which may include multiple characteristics, of the sound data; (g) comparing one or more characteristics or signatures of the sound data collected within the vehicle to one or more characteristics or sound signatures of the siren sound data; and (h) determining, based upon such a comparison, whether an emergency services vehicle is approaching or otherwise proximal the vehicle, such as, for example, based upon the presence of one or more siren sound characteristics or siren sound signatures in the sound data collected within the vehicle.

Exemplary System for Assessing Sound within a Vehicle and to Alert the Driver

FIG. 1 depicts a view of an exemplary system 100 for assessing sound within a vehicle to alert a driver of the vehicle to an approaching emergency services vehicle. In one exemplary embodiment, system 100 may include a client device, such as a client device 102. Client device 102 may be associated with an occupant of a vehicle 101, such as a pilot or driver of a non-emergency services or passenger vehicle 101. System 100 may also include network 104, a web server 106, a database server 108, and/or a database 110.

Accordingly, in the exemplary, client device 102 may be any personal computing device and/or any mobile communications device of a user, such as a personal computer, a tablet computer, a smartphone, and the like. Client device 102 may, as described below, include one or more microphones and may be configured to display a software application (e.g., a smartphone "app"), which may be configured to receive, or "listen to" sound, such as ambient noise, within vehicle 101. To this end, client device 102 may include or execute software for viewing and interacting with a smartphone app that receives or listens to sound within vehicle 101.

Network 104 may be any electronic communications system, such as any computer network or collection of computer networks, and may incorporate various hardware and/or software. Communication over network 104 may be accomplished via any suitable communication channels, such as, for example, one or more telephone networks, one or more extranets, one or more intranets, the Internet, one or more point of interaction devices (e.g., point of sale devices, smart phones, cellular phones), various online and/or offline communications systems, such as various local area and wide area networks, and the like.

Web server 106 may be any computer or computer system that is configured to receive and process data, such as sound data, transmitted by and received from client device 102. Web server 106 may be coupled between client device 102 and database server 108. More particularly, web server 106 may be communicatively coupled to client device 102 via network 104. In various embodiments, web server 106 may be directly coupled to database server 108 and/or communicatively coupled to database server 108 via a network, such as network 104. Web server 106 may, in addition, function to store, process, and/or deliver one or more web pages and/or any other suitable content to client device 102. Web server 106 may, in addition, receive data, such as sound data provided to the smartphone app (as described herein) from client device 102 for subsequent transmission to database server 108.

In various embodiments, web server 106 may implement various hardware and/or software, such as, for example, one or more communication protocols, one or more message brokers, one or more data processing engines, one or more servlets, one or more application servers, and the like. For instance, in one embodiment, web server 106 may implement web server 106 may implement a message broker program module configured to translate a message or communications from a messaging protocol of a sending device to a messaging protocol of a receiving device (e.g., RABBITTMQ, KAFKA, ACTIVEMQ, KESTREL). Further still, in some embodiments, web server 106 may implement a data processing engine, such as a cluster computing framework like APACHE SPARK. In addition, in various embodiments, web server 106 may implement servlet and/or JSP server, such as APACHE TOMCAT.

Database server 108 may be any computer or computer program that provides database services to one or more other computers or computer programs. In various embodiments, database server 108 may be communicatively coupled between web server 108 and database 110. Database server 108 may, in addition, function to process data received from web server 106, such as sound data, which may include, for example, sound data received from client device 102.

In various embodiments, web server 106 and/or database server 108 may implement one or more machine learning algorithms, as described herein, to process sound data, such as sound data stored within database 110. For example, in some embodiments, web server 106 and/or database server 108 may process sound data associated with a siren of an emergency services vehicle 103, and/or a plurality of emergency services vehicle sirens, to identify one or more characteristics associated with emergency services vehicle sirens. Such characteristics may include any characteristics or features associated with the one or more sirens, such as frequency characteristics, amplitude characteristics, and/or any other waveform characteristics of the sound data (which may be digital or analog) of one or more emergency services vehicle sirens. In some embodiments, web server 106 and/or database server 108 may identify a sound "signature" or a sound "fingerprint" associated with one or more emergency services vehicle sirens. A sound signature of an emergency services vehicle siren may include a plurality of waveform or other characteristics associated with an emergency services vehicle siren and may function to uniquely identify the emergency services vehicle siren.

Database 110 may be any organized collection of data, such as, for example, any data organized as part of a relational data structure, any data organized as part of a flat file, and the like. Database 110 may be communicatively coupled to database server 108 and may receive data from, and provide data to, database server 108, such as in response to one or more requests for data, which may be provided via a database management system (DBMS) implemented on database server 108. In various embodiments, database 110 may be a non-relational database, such as an APACHE HADOOP database.

Although the components of system 100 are described below and depicted at FIG. 1 as being interconnected in a particular configuration, it is contemplated that the systems, subsystems, hardware and software components, various network components, and database systems described herein may be variously configured and interconnected and may communicate with one another within system 100 to facilitate the processes and advantages described herein. For example, although a single web server 106, a single database server 108, and a single database 110 are described above, it will be appreciated that system 100 may include any suitable number of interconnected, communicatively coupled, web servers, database servers, and/or databases. Further, although certain functions, processes, and operations are described herein with respect to one or more system components, it is contemplated that one or more other system components may perform the functions, processes, and operations described herein.

Exemplary Client Device

Figure 2:
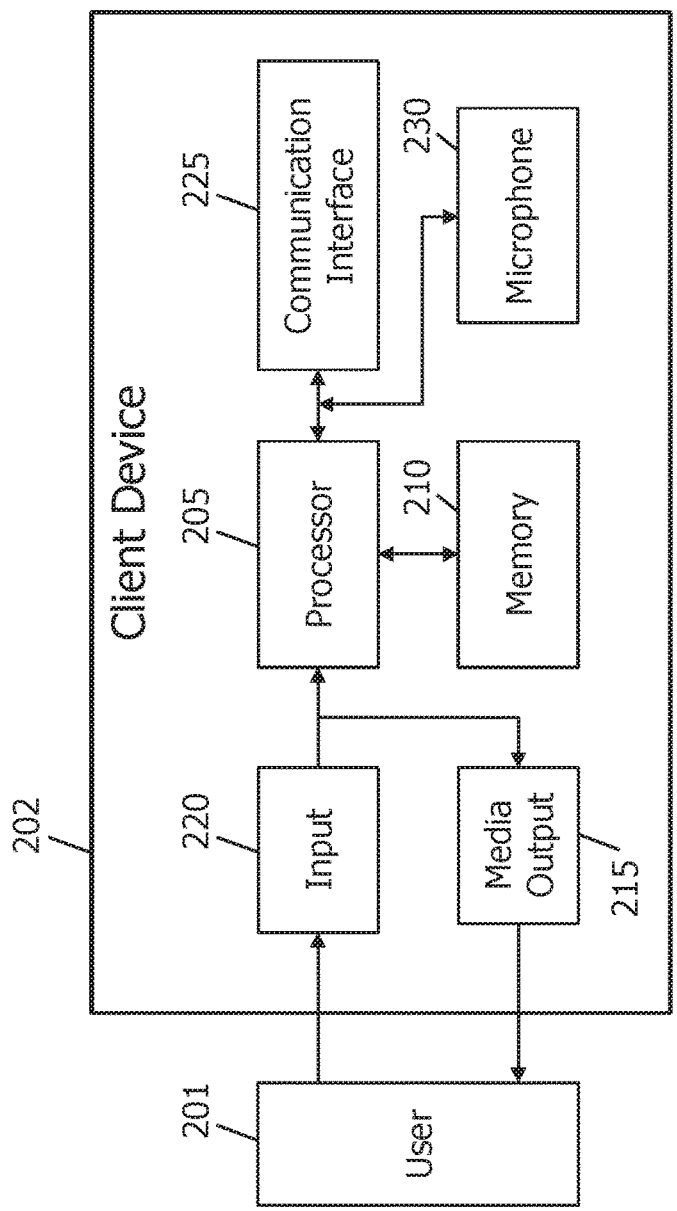
FIG. 2 illustrates an exemplary configuration of a client device shown in FIG. 1, in accordance with one embodiment of the present disclosure.

FIG. 2 depicts an exemplary configuration of a client device 202, such as client device 102, as shown in FIG. 1, and in accordance with one embodiment of the present disclosure. Client device 202 may be operated by a user 201. Client device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or transaction data to be stored and retrieved. Memory area 210 may include one or more computer readable media.

Client device 202 may also include at least one media output component 215 for presenting information to user 201. Media output component 215 may be any component capable of conveying information to user 201. In some embodiments, media output component 215 may include an output adapter (not shown) such as a video adapter and/or an audio adapter. An output adapter may be operatively coupled to processor 205 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 215 may be configured to present a graphical user interface (e.g., a web browser and/or a client application) to user 201. A graphical user interface may include, for example, an online store interface for viewing and/or purchasing items, and/or a wallet application for managing payment information. In some embodiments, client device 202 may include an input device 220 for receiving input from user 201. User 201 may use input device 220 to, without limitation, select and/or enter data, such as, for example, one or more report criteria or report filters.

Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

Client device 202 may also include a communication interface 225, communicatively coupled via network 110 to web server 106 (shown in FIG. 1). Communication interface 225 may include, for example, a wired or wireless network adapter and/or a wireless data transceiver for use with a mobile telecommunications network.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website.

Client device 202 may also include one or more microphones, such as microphone 230. Microphone 230 may be any suitable microphone for receiving and/or collecting sound data within vehicle 101. Microphone 230 may be communicatively coupled to processor 205, which may implement an analog to digital converter in software to convert analog sound data received by microphone 230 to digital data. In some embodiments, client device 202 may include a separate (e.g., hardware and/or software) analog to digital converter coupled between microphone 230 and processor 205.

Exemplary Database System

Figure 3:
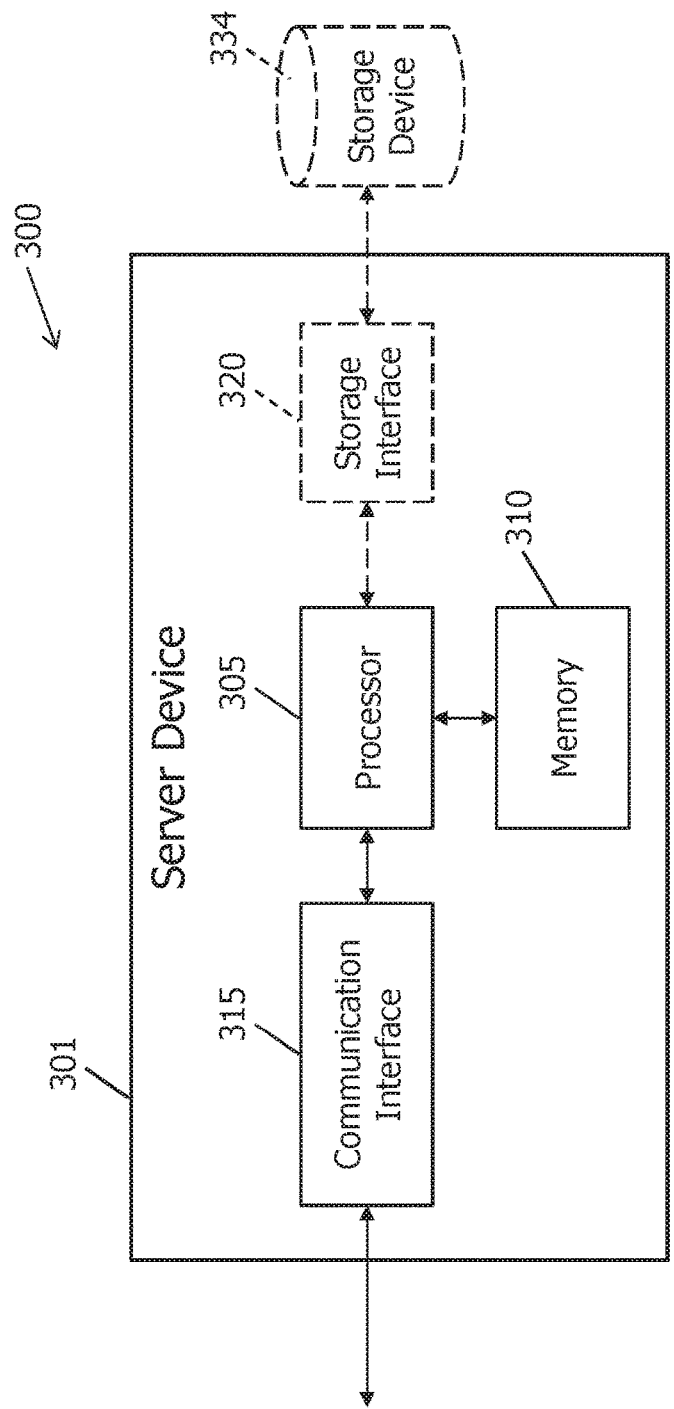
FIG. 3 illustrates an exemplary configuration of a server shown in FIG. 1, in accordance with one embodiment of the present disclosure.

FIG. 3 depicts an exemplary database system 300 such as database server 108 and database 110, as shown in FIG. 1, and in accordance with one exemplary embodiment of the present disclosure. Accordingly, database system 300 may include a server computer device 301 (e.g., database server 108), which may, in turn, include a processor 305 for executing instructions. Instructions may be stored in a memory area 310. Processor 305 may include one or more processing units (e.g., in a multi-core configuration).

Processor 305 may be operatively coupled to a communication interface 315 such that server computer device 301 is capable of communicating with a remote computing device, as described above. For example, communication interface 315 may receive requests from client device 202 via the Internet and/or over a computer network.

Processor 305 may also be operatively coupled to a storage device 334 (e.g., database 110). Storage device 334 may be any computer-operated hardware suitable for storing and/or retrieving data, such as, but not limited to, data associated with database 320. In some embodiments, storage device 334 may be integrated in server computer device 301. For example, server computer device 301 may include one or more hard disk drives as storage device 334.

In other embodiments, storage device 334 may be external to server computer device 301 and may be accessed by a plurality of server computer devices 301. For example, storage device 334 may include a storage area network (SAN), a network attached storage (NAS) system, and/or multiple storage units such as hard disks and/or solid state disks in a redundant array of inexpensive disks (RAID) configuration.

In some embodiments, processor 305 may be operatively coupled to storage device 334 via a storage interface 320. Storage interface 320 may be any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Exemplary Process for Assessing Sound within a Vehicle and to Alert the Driver

FIG. 4 depicts a flowchart of an exemplary process 400 implemented by the computer system shown in FIG. 1 for assessing sound within a vehicle to alert a driver of the vehicle to an approaching, or proximally located, emergency services vehicle 103. Accordingly, in in the exemplary embodiment, system 100 (e.g., web server 106 and/or database server 108) may analyze sound data associated with the sirens of one or more emergency services vehicles (step 402). This sound data may be stored in database 110 and may include digital and/or analog sound data associated with the sirens of a plurality of emergency services vehicles.

The analysis may be performed based upon one or more machine learning algorithms (as described below), such as one or more machine learning algorithms configured to identify one or more characteristics common to emergency services vehicle sirens. In some cases, a machine learning algorithm may also identify a plurality of different emergency services vehicle sirens based upon the analysis. Each of these different identified sirens may be associated with one or more characteristics, such as frequency characteristics, amplitude characteristics, various other waveform characteristics, and the like, and each may be stored in database 110 as a unique siren sound or siren "signature."

Thus, system 100 may identify, based upon an analysis of various sound data associated with one or more emergency services vehicles, one or more characteristics, such as at least a first characteristic, associated with one or more emergency services vehicle sirens (step 404). Where a particular siren sound is identified and associated with a plurality of characteristics, these characteristics may collectively be referred to as a siren signature or a siren sound signature.

During operation of vehicle 101, system 100 may, in addition, receive, from client device 102 (which may be disposed or located within vehicle 101), sound data, such as ambient sound data, collected within vehicle 101, such as within a cabin or interior of vehicle 101 (step 406). More particularly, a smartphone app, as described above, running on client device 102 may "listen" to or detect the sound within vehicle 101. Client device 102 may, in addition (and as described above) include an analog to digital converter, which may convert analog sound data collected by client device 102 to digital sound data.

In response to receiving the sound data from client device 102, system 100 may analyze the sound data (step 408). More particularly, system 100 may analyze the sound data collected within vehicle 101 to identify one or more characteristics, such as at least a second characteristic, of the sound data collected within vehicle 101 (step 410). These characteristics may include frequency characteristics, amplitude characteristics, various other waveform characteristics, and the like. Further, where a plurality of characteristics are identified in conjunction with the sound data, the sound characteristics may collectively define a second or vehicle sound signature.

In addition, in some cases, system 100 may identify a plurality of groups of characteristics or a plurality of sound signatures within the sound data, such that sound data collected within vehicle 101 actually includes a plurality of sound signatures. This may occur, for example, as a result of a plurality of distinct sounds within vehicle 101, such as a first sound associated with music playing within vehicle 101 and a second sound associated with an emergency services vehicle siren penetrating or impinging upon vehicle 101. The emergency services vehicle siren sound may, in other words, intermingle or intermix with one or more other sounds within vehicle 101, such as the sound of music playing within vehicle 101.

System 100 may, under such a circumstance, identify characteristics associated with both sounds, such that the music playing within vehicle 101 is associated with a first characteristic, a first group of characteristics, or a first sound signature, and the sound of the emergency services vehicle siren impinging upon vehicle 101 is associated with a second characteristic, a second group of characteristics, or a second sound signature.

In response to identifying at least one characteristic associated with the sound data collected within vehicle 101, system 100 may compare the at least one characteristic to at least one characteristic of one or more emergency services vehicle siren sounds, as described above (step 412). For example, system 100 may compare one or more frequency characteristics and/or one or more amplitude characteristics of the sound data collected within vehicle 101 to one or more frequency characteristics and/or one or more amplitude characteristics of the sound data associated with a particular emergency services vehicle siren. If the comparison yields a match, system 100 may determine that the sound data collected within vehicle 101 includes frequency, amplitude, or other waveform characteristics of an emergency services vehicle siren, which may suggest or indicate that emergency services vehicle 103 is approaching or proximal to vehicle 101. Thus, system 100 may determine, based upon such a comparison, that emergency services vehicle 103 is approaching or otherwise proximal to vehicle 101 (step 414).

In some embodiments, system 100 may determine that emergency services vehicle 103 is approaching or otherwise proximal to vehicle 101 based upon a partial or substantial match between at least one characteristic of sound data collected within vehicle 101 and at least one characteristic of sound data associated with an emergency services vehicle siren. As used herein, a "substantial" match may be made between at least one characteristic of sound data collected within vehicle 101 and at least one characteristic of sound data associated with an emergency services vehicle siren when the characteristics are similar (e.g., within a predefined range of each other) but not exactly the same.

Further, in some embodiments, system 100 may compare a plurality of frequency characteristics and/or a plurality of amplitude characteristics of the sound data collected within vehicle 101 to a plurality of frequency characteristics and/or a plurality of amplitude characteristics of the sound data associated with a particular emergency services vehicle siren. Specifically, system 100 may compare a sound signature associated with the sound data collected within vehicle 101 to a sound signature of an emergency services vehicle siren. In addition, in some cases, system 100 may compare a sound signature associated with the sound data collected within vehicle 101 to a plurality of sound signatures associated with a plurality of emergency services vehicle sirens. If the sound signature associated with the sound data collected within vehicle 101 matches, or substantially matches, at least one sound signature of an emergency services vehicle siren, system 100 may determine that emergency services vehicle 103 is approaching or proximal to vehicle 101. In addition, where system 100 compares the sound signature associated with the sound data collected within vehicle 101 to a plurality of sound signatures associated with a plurality of emergency services vehicle sirens, system 100 may further identify a specific type of emergency services vehicle (e.g., ambulance, fire and rescue vehicle, etc.) associated with the sound signature that matches, or substantially matches, the sound data collected within vehicle 101.

System 100 may, in addition, provide an indication, such as a message and/or a control instruction, to client device 102 and/or an onboard diagnostics system controller of vehicle 101 indicating that emergency services vehicle 103 is approaching or proximal to vehicle 101. For example, system 100 may provide an alert to client device 102, such an audible and/or visual alert, indicating the presence of emergency services vehicle 103. Client device 102 may receive and broadcast an audible alert and/or display a visual alert, such that an occupant of vehicle 101 is alerted to the presence of emergency services vehicle 103. Further, in some embodiments, a control instruction may be provided to an onboard diagnostics system controller of vehicle 101, which may cause a device within vehicle 101, such as a radio and/or a video display, to broadcast or display an alert indicating the presence of emergency services vehicle 103. In addition, in some embodiments, the control instruction may cause the onboard diagnostics system controller of vehicle 101 to reduce a volume level (e.g., of a radio or another entertainment device) within vehicle 101.

In one exemplary embodiment, client device 102 and/or the onboard diagnostics system controller of vehicle 101 may assess the driving behavior of the pilot or driver of vehicle 101 in response to an indication or alert that emergency services vehicle 103 is approaching or proximal vehicle 101. For example, client device 102, (which may include, in addition to microphone 230, a GPS receiver and/or an accelerometer) may be capable of determining whether the driver of vehicle 101 reduces a sound volume within vehicle 101 and/or whether the driver of vehicle 101 removes vehicle 101 from traffic and/or takes other evasive or precautionary maneuvers in response to receiving the alert. Such data may also be collected by the onboard diagnostics system controller of vehicle 101.

System 100 may, in addition, store the detected and/or assessed driving behavior for analysis and evaluation. For example, system 100 may analyze the driving behavior of a driver of vehicle 101 to determine whether the driver reduces a sound volume or takes evasive or precautionary driving maneuvers in response to receiving an alert. In some embodiments, if the driver reduces a sound volume or takes evasive or precautionary maneuvers, system 100 may assign a particular safety rating to the driver, which may be used in conjunction with an auto insurance premium (e.g., to lower an auto insurance premium) of the driver. On the other hand, if the driver does not reduce a sound volume or does not take evasive or precautionary maneuvers, system 100 may assign a particular safety rating to the driver, which may be used in conjunction with an auto insurance premium (e.g., to raise or refuse a reduction of an auto insurance premium) of the driver.

In some embodiments, client device 102 may receive a signal that indicates a location or a position of emergency services vehicle 103, such as an emergency dispatch signal, which may be broadcast over a particular area by an electronic communications system, such as by one or more cellular sites or cellular towers and/or received by the backend system (e.g., web server 106 and/or database server 108) and provided to client device 102. The emergency dispatch signal may include GPS coordinates associated with emergency services vehicle 103 and/or any other location data that provides, or that may be analyzed by client device 102 the backend system to determine, a location or route of approaching emergency services vehicle 103.

In response to receiving such an emergency dispatch signal, client device 102 and/or the backend system may analyze data included in the signal, such as one or more GPS coordinates associated with emergency services vehicle 103 and/or a route of emergency services vehicle 103 to determine whether emergency services vehicle 103 is approaching, or otherwise proximal, client device 102 (or vehicle 101 within which client device 102 operates). If client device 102 and/or the backend system determines that emergency services vehicle 103 is approaching or proximal, client device 102 may, in some embodiments, provide an alert (e.g., an alert irrespective of received sound data), as described herein.

In other embodiments, client device 102 and/or the backend system may reduce a matching threshold associated with the comparison of sound data received within vehicle 101 to sound data associated with one or more emergency services vehicle sirens (as described above). For example, in the case that an emergency dispatch signal is received, the amount of matching required between a characteristic associated with sound data collected within vehicle 101 and a characteristic of sound data associated with one or more emergency services vehicle sirens may be reduced, such that sound data collected within vehicle 101 that would only indicate a weak or attenuated emergency services vehicle siren (e.g., a distant siren) may nevertheless, in conjunction with the emergency dispatch signal, trigger an alert, as described herein.

In addition, in some embodiments, client device 102 and/or the backend system may provide map directions, such as to a display of client device 102 and/or a display within vehicle 101. Such an action may be implemented in any of the embodiments, described herein, including embodiments that include a received emergency dispatch signal and embodiments that do not include such a signal and/or embodiments in which such a signal is not received. Thus, in some embodiments, client device 102 and/or a display within vehicle 101 (such as a GPS navigation system within vehicle 101) may display a location of approaching emergency services vehicle 103, a route that would allow the driver of vehicle 101 to avoid or navigate around approaching emergency services vehicle 103, and the like.

Exemplary Embodiments & Functionality

In one aspect, a computer-based method for assessing sound within a vehicle to alert a driver of the vehicle to an approaching emergency services vehicle is provided. The method may be performed using a sound analysis computing device that includes at least one processor in communication with at least one memory device, and the method may include: (i) analyzing, based upon a machine learning algorithm, sound data associated with an emergency services vehicle siren; (ii) identifying, based upon the analyzing, a first characteristic associated with the emergency services vehicle siren; (iii) receiving, from a client device disposed within the vehicle, sound data collected within the vehicle; (iv) analyzing the sound data collected within the vehicle; (v) identifying, based upon the analyzing, a second characteristic associated with the sound data collected within the vehicle; (vi) comparing the first characteristic to the second characteristic; and (vii) determining, based upon the comparing, whether the first characteristic substantially matches the second characteristic to determine whether the emergency services vehicle is approaching the vehicle.

In yet another aspect, a computer system for assessing sound within a vehicle to alert a driver of the vehicle to an approaching emergency services vehicle is provided. The computer system may include a processor and a non-transitory, tangible, computer-readable storage medium having instructions stored thereon that, in response to execution by the processor, cause the processor to perform operations including: (i) analyzing, based upon a machine learning algorithm, sound data associated with an emergency services vehicle siren; (ii) identifying, based upon the analyzing, a first characteristic associated with the emergency services vehicle siren; (iii) receiving, from a client device disposed within the vehicle, sound data collected within the vehicle; (iv) analyzing the sound data collected within the vehicle; (v) identifying, based upon the analyzing, a second characteristic associated with the sound data collected within the vehicle; (vi) comparing the first characteristic to the second characteristic; and (vii) determining, based upon the comparing, whether the first characteristic substantially matches the second characteristic to determine whether the emergency services vehicle is approaching the vehicle.

In yet another aspect, a non-transitory computer readable medium that includes executable instructions for assessing sound within a vehicle to alert a driver of the vehicle to an approaching emergency services vehicle is provided. The instructions may be executed by a sound analysis computing device that includes at least one processor in communication with at least one memory device. When the instructions are executed, the instructions may cause the processor of the sound analysis computing device to perform operations including: (i) analyzing, based upon a machine learning algorithm, sound data associated with an emergency services vehicle siren; (ii) identifying, based upon the analyzing, a first characteristic associated with the emergency services vehicle siren; (iii) receiving, from a client device disposed within the vehicle, sound data collected within the vehicle; (iv) analyzing the sound data collected within the vehicle; (v) identifying, based upon the analyzing, a second characteristic associated with the sound data collected within the vehicle; (vi) comparing the first characteristic to the second characteristic; and (vii) determining, based upon the comparing, whether the first characteristic substantially matches the second characteristic to determine whether the emergency services vehicle is approaching the vehicle.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer-based method for assessing sound within a vehicle to alert a driver of the vehicle to an approaching emergency services vehicle, the method performed using a sound analysis computing device comprising at least one processor in communication with at least one memory device, the method comprising:

analyzing, based upon a pattern recognition machine learning algorithm, sound data associated with an emergency services vehicle siren to facilitate training the pattern recognition machine learning algorithm;

identifying, based upon the pattern recognition machine learning algorithm, a first characteristic associated with the emergency services vehicle siren;

receiving, from a client device disposed within the vehicle, sound data collected within the vehicle;

analyzing the sound data collected within the vehicle;

identifying, based upon the analyzing and in real time, a second characteristic associated with the sound data collected within the vehicle;

receiving, from an emergency dispatch system, an emergency dispatch signal;

determining, in response to receiving the emergency dispatch signal, a reduced matching threshold;

comparing the first characteristic to the second characteristic; and determining, based upon the comparing, whether the first characteristic substantially matches the second characteristic within the reduced matching threshold to determine whether the emergency services vehicle is approaching the vehicle.

2. The method of claim 1, further comprising:

analyzing based upon the pattern recognition machine learning algorithm, sound data associated with a plurality of emergency services vehicle sirens;

identifying, based upon the pattern recognition machine learning algorithm, at least one characteristic associated with each of the plurality of emergency services vehicle sirens;

comparing each of the characteristics associated with each of the plurality of emergency services vehicle sirens to the second characteristic associated with the sound data collected within the vehicle; and determining, based upon the comparing, whether any of the characteristics associated with each of the plurality of emergency services vehicle sirens substantially matches the second characteristic to determine whether the emergency services vehicle is approaching the vehicle.

3. The method of claim 1, further comprising identifying, based upon the pattern recognition machine learning algorithm, a first sound signature associated with the emergency services vehicle siren, wherein the first sound signature includes a plurality of characteristics.

4. The method of claim 3, further comprising identifying, based upon the pattern recognition machine learning algorithm, a second sound signature associated with the sound data collected within the vehicle, wherein the second sound signature includes a plurality of characteristics.

5. The method of claim 4, further comprising:

comparing the first sound signature to the second sound signature; and determining, based upon the comparing, whether the first sound signature substantially matches the second sound signature to determine whether the emergency services vehicle is approaching the vehicle.

6. The method of claim 1, further comprising providing a control instruction to an on-board diagnostics system controller within the vehicle to reduce a volume level associated with at least one entertainment device located within the vehicle.

7. The method of claim 1, wherein the emergency dispatch signal indicates a location of the emergency services vehicle, the method further comprising analyzing the emergency dispatch signal to determine whether the emergency services vehicle is approaching the vehicle.

8. The method of claim 7, further comprising generating map directions for display on at least one of the client device and a navigation display of the vehicle based upon the emergency dispatch signal, wherein the map directions identify at least one of the location of the emergency services vehicle or a route to navigate around the emergency services vehicle.

9. The method of claim 7, further comprising providing an indication to the client device that the emergency services vehicle is approaching the vehicle, such that the client device generates at least one of an audible alert or a visual alert in response.

10. The method of claim 7, wherein the determining, based upon the comparing, whether the first characteristic substantially matches the second characteristic within the reduced matching threshold to determine whether the emergency services vehicle is approaching the vehicle further comprises:

analyzing the emergency dispatch signal to identify global positioning system (GPS) coordinates of the emergency services vehicle;

determining, based upon the GPS coordinates, whether the emergency services vehicle is approaching the vehicle; and reducing, in response to determining that the emergency services vehicle is approaching the vehicle, a matching threshold to determine the reduced matching threshold, wherein, in response to reducing the matching threshold, an amount of matching needed to determine that the emergency services vehicle is approaching the vehicle is less than an amount of matching needed to make the same determination in the absence of the emergency dispatch signal.

11. A computer system for assessing sound within a vehicle to alert a driver of the vehicle to an approaching emergency services vehicle, the computer system comprising:

a processor; and a non-transitory, tangible, computer-readable storage medium having instructions stored thereon that, in response to execution by the processor, cause the processor to perform operations comprising:

analyzing based upon a pattern recognition machine learning algorithm, sound data associated with an emergency services vehicle siren to facilitate training the pattern recognition machine learning algorithm;

identifying, based upon the pattern recognition machine learning algorithm, a first characteristic associated with the emergency services vehicle siren;

receiving, from a client device disposed within the vehicle, sound data collected within the vehicle;

analyzing the sound data collected within the vehicle;

identifying, based upon the analyzing and in real time, a second characteristic associated with the sound data collected within the vehicle;

receiving, from an emergency dispatch system, an emergency dispatch signal;

determining, in response to receiving the emergency dispatch signal, a reduced matching threshold;

comparing the first characteristic to the second characteristic;

determining, based upon the comparing, whether the first characteristic substantially matches the second characteristic within the reduced matching threshold to determine whether the emergency services vehicle is approaching the vehicle.

12. The computer system of claim 11, wherein the processor is further configured to perform operations comprising:

analyzing, based upon the pattern recognition machine learning algorithm, sound data associated with a plurality of emergency services vehicle sirens;

identifying, based upon the pattern recognition machine learning algorithm, at least one characteristic associated with each of the plurality of emergency services vehicle sirens;

comparing each of the characteristics associated with each of the plurality of emergency services vehicle sirens to the second characteristic associated with the sound data collected within the vehicle; and determining, based upon the comparing, whether any of the characteristics associated with each of the plurality of emergency services vehicle sirens substantially matches the second characteristic to determine whether the emergency services vehicle is approaching the vehicle.

13. The computer system of claim 11, wherein the processor is further configured to perform operations comprising identifying, based upon the pattern recognition machine learning algorithm, a first sound signature associated with the emergency services vehicle siren, wherein the first sound signature includes a plurality of characteristics.

14. The computer system of claim 13, wherein the processor is further configured to perform operations comprising identifying, based upon the pattern recognition machine learning algorithm, a second sound signature associated with the sound data collected within the vehicle, wherein the second sound signature includes a plurality of characteristics.

15. The computer system of claim 14, wherein the processor is further configured to perform operations comprising:
   comparing the first sound signature to the second sound signature; and
   determining, based upon the comparing, whether the first sound signature substantially matches the second sound signature to determine whether the emergency services vehicle is approaching the vehicle.

16. The computer system of claim 11, wherein the processor is further configured to perform operations comprising providing an indication to the client device that the emergency services vehicle is approaching the vehicle, such that the client device generates at least one of an audible alert or a visual alert in response.

17. The computer system of claim 11, wherein the processor is further configured to perform operations comprising providing a control instruction to an on-board diagnostics system controller within the vehicle to reduce a volume level associated with at least one entertainment device located within the vehicle.

18. The computer system of claim 11, wherein the processor is further configured to perform operations comprising:
   analyzing the emergency dispatch signal to determine whether the emergency services vehicle is approaching the vehicle.

19. The computer system of claim 18, wherein the processor is further configured to perform operations comprising generating map directions for display on at least one of the client device and a navigation display of the vehicle based upon the emergency dispatch signal, wherein the map directions identify at least one of the location of the emergency services vehicle or a route to navigate around the emergency services vehicle.

20. The computer system of claim 18, wherein the processor is further configured to perform operations comprising providing an indication to the client device that the emergency services vehicle is approaching the vehicle, such that the client device generates at least one of an audible alert or a visual alert in response.

21. The computer system of claim 18, wherein the determining, based upon the comparing, whether the first characteristic substantially matches the second characteristic within the reduced matching threshold to determine whether the emergency services vehicle is approaching the vehicle further comprises:
   analyzing the emergency dispatch signal to identify global positioning system (GPS) coordinates of the emergency services vehicle;
   determining, based upon the GPS coordinates, whether the emergency services vehicle is approaching the vehicle; and
   reducing, in response to determining that the emergency services vehicle is approaching the vehicle, a matching threshold to determine the reduced matching threshold, wherein, in response to reducing the matching threshold, an amount of matching needed to determine that the emergency services vehicle is approaching the vehicle is less than an amount of matching needed to make the same determination in the absence of the emergency dispatch signal.

22. A non-transitory computer readable medium that includes executable instructions for assessing sound within a vehicle to alert a driver of the vehicle to an approaching emergency services vehicle, wherein when executed by a sound analysis computing device comprising at least one processor in communication with at least one memory device, the computer executable instructions cause the sound analysis computing device to:
   analyze, based upon a pattern recognition machine learning algorithm, sound data associated with an emergency services vehicle siren to facilitate training the pattern recognition machine learning algorithm;
   identify, based upon the pattern recognition machine learning algorithm, a first characteristic associated with the emergency services vehicle siren;
   receive, from a client device disposed within the vehicle, sound data collected within the vehicle;
   analyze the sound data collected within the vehicle;
   identify, based upon the analyzing and in real time, a second characteristic associated with the sound data collected within the vehicle;
   receive, from an emergency dispatch system, an emergency dispatch signal;
   determine, in response to receiving the emergency dispatch signal, a reduced matching threshold;
   compare the first characteristic to the second characteristic; and
   determine, based upon the comparing, whether the first characteristic substantially matches the second characteristic within the reduced matching threshold to determine whether the emergency services vehicle is approaching the vehicle.

23. The non-transitory computer readable medium of claim 22, wherein the computer executable instructions further cause the sound analysis computing device to:
   analyze, based upon the pattern recognition machine learning algorithm, sound data associated with a plurality of emergency services vehicle sirens;
   identify, based upon the pattern recognition machine learning algorithm, at least one characteristic associated with each of the plurality of emergency services vehicle sirens;
   compare each of the characteristics associated with each of the plurality of emergency services vehicle sirens to the second characteristic associated with the sound data collected within the vehicle; and
   determine, based upon the comparing, whether any of the characteristics associated with each of the plurality of emergency services vehicle sirens substantially matches the second characteristic to determine whether the emergency services vehicle is approaching the vehicle.

24. The non-transitory computer readable medium of claim 22, wherein the computer executable instructions further cause the sound analysis computing device to identify, based upon the pattern recognition machine learning algorithm, a first sound signature associated with the emergency services vehicle siren, wherein the first sound signature includes a plurality of characteristics.

25. The non-transitory computer readable medium of claim 24, wherein the computer executable instructions further cause the sound analysis computing device to identify, based upon the pattern recognition machine learning algorithm, a second sound signature associated with the sound data collected within the vehicle, wherein the second sound signature includes a plurality of characteristics.

26. The non-transitory computer readable medium of claim 25, wherein the computer executable instructions further cause the sound analysis computing device to:
compare the first sound signature to the second sound signature; and
determine, based upon the comparing, whether the first sound signature substantially matches the second sound signature to determine whether the emergency services vehicle is approaching the vehicle.

27. The non-transitory computer readable medium of claim 22, wherein the computer executable instructions further cause the sound analysis computing device to provide an indication to the client device that the emergency services vehicle is approaching the vehicle, such that the client device generates at least one of an audible alert or a visual alert in response.

28. The non-transitory computer readable medium of claim 22, wherein the computer executable instructions further cause the sound analysis computing device to provide a control instruction to an on-board diagnostics system controller within the vehicle to reduce a volume level associated with at least one entertainment device located within the vehicle.

29. The non-transitory computer readable medium of claim 22, wherein the computer executable instructions further cause the sound analysis computing device to
analyze the emergency dispatch signal to determine whether the emergency services vehicle is approaching the vehicle.

30. The non-transitory computer readable medium of claim 29, wherein the computer executable instructions further cause the sound analysis computing device to generate map directions for display on at least one of the client device and a navigation display of the vehicle based upon the emergency dispatch signal, wherein the map directions identify at least one of the location of the emergency services vehicle or a route to navigate around the emergency services vehicle.

31. The non-transitory computer readable medium of claim 29, wherein the computer executable instructions further cause the sound analysis computing device to provide an indication to the client device that the emergency services vehicle is approaching the vehicle, such that the client device generates at least one of an audible alert or a visual alert in response.

32. The non-transitory computer readable medium of claim 29, wherein the computer executable instructions further cause the sound analysis computing device to:
analyze the emergency dispatch signal to identify global positioning system (GPS) coordinates of the emergency services vehicle;
determine, based upon the GPS coordinates, whether the emergency services vehicle is approaching the vehicle; and
reduce, in response to determining that the emergency services vehicle is approaching the vehicle, a matching threshold to determine the reduced matching threshold, wherein, in response to reducing the matching threshold, an amount of matching needed to determine that the emergency services vehicle is approaching the vehicle is less than an amount of matching needed to make the same determination in the absence of the emergency dispatch signal.

33. The method of claim 1, further comprising
receiving, from the client device disposed within the vehicle, a location of the vehicle by receiving GPS data from the client device;
receiving a location of the emergency services vehicle; and
analyzing the vehicle location, the emergency services vehicle location, the first characteristic, and the second characteristic to determine whether the emergency services vehicle is approaching the vehicle.

* * * * *